United States Patent [19]

Nakagami et al.

[11] Patent Number: 5,621,643
[45] Date of Patent: Apr. 15, 1997

[54] DOZING SYSTEM FOR BULLDOZERS

[75] Inventors: Hiroshi Nakagami; Shigenori Matsushita; Shigeru Yamamoto, all of Hirakata, Japan

[73] Assignee: Komatsu Ltd., Tokyo, Japan

[21] Appl. No.: 129,080

[22] PCT Filed: Apr. 10, 1992

[86] PCT No.: PCT/JP92/00457

§ 371 Date: Oct. 7, 1993

§ 102(e) Date: Oct. 7, 1993

[87] PCT Pub. No.: WO92/18706

PCT Pub. Date: Oct. 29, 1992

[30] Foreign Application Priority Data

Apr. 12, 1991 [JP] Japan ..................... 3-108451

[51] Int. Cl.$^6$ .................................. B60K 28/16
[52] U.S. Cl. ................. 364/424.07; 340/686; 414/699; 172/3; 172/7; 180/197
[58] Field of Search .................. 364/426.02, 426.03, 364/426.01, 424.07, 566; 180/197; 414/686; 303/95, 96, 97, 98

[56] References Cited

U.S. PATENT DOCUMENTS

| | | | |
|---|---|---|---|
| 3,711,971 | 1/1973 | Martin | 37/124 |
| 4,053,018 | 10/1977 | Takeda | 172/4.5 |
| 4,157,118 | 6/1979 | Suganami et al. | 172/4.5 |
| 4,162,708 | 7/1979 | Johnson | 172/4.5 |
| 4,166,506 | 9/1979 | Tezuka et al. | 172/4.5 |
| 4,282,933 | 8/1981 | Suganami et al. | 172/4.5 |
| 4,423,785 | 1/1984 | Kurihara et al. | 172/3 |
| 4,516,117 | 5/1985 | Couture et al. | 340/685 |
| 4,833,615 | 5/1989 | Bitner et al. | 364/463 |
| 4,916,618 | 4/1990 | Stoltman | 364/426.02 |
| 5,065,326 | 11/1991 | Salim | 364/424.07 |
| 5,219,411 | 6/1993 | Yamamoto et al. | 180/197 |
| 5,287,280 | 2/1994 | Yamamoto et al. | 364/426.03 |
| 5,293,944 | 3/1994 | Matsumoto et al. | 172/2 |
| 5,297,649 | 3/1994 | Yamamoto et al. | 180/197 |
| 5,333,479 | 8/1994 | Yamamoto et al. | 172/3 |

FOREIGN PATENT DOCUMENTS

| | | |
|---|---|---|
| 48-78702 | 10/1973 | Japan . |
| 64-62525 | 3/1989 | Japan . |
| 3-43523 | 2/1991 | Japan . |

Primary Examiner—Kevin J. Teska
Assistant Examiner—Thai Phan
Attorney, Agent, or Firm—Armstrong, Westerman, Hattori, McLeland & Naughton

[57] ABSTRACT

A dozing system for a bulldozer with which dozing can be carried out by a simple operation without giving a great deal of fatigue to the operator.

When the running slip of a vehicle body is not detected by a running slip detector, a blade is lifted or lowered by a comparison controller such that an actual tractive force of the vehicle body detected by an actual tractive force detector becomes coincident with a target tractive force set by e.g., a dial, whereby the amount of loads applied to the blade by excavating and moving earth can be maintained constant. On the other hand, when the running slip of the vehicle body is detected by the running slip detector, the comparison controller lifts the blade, thereby reducing the amount of loads applied to the blade by excavating and moving earth in order to eliminate the running slip.

28 Claims, 9 Drawing Sheets

DOZING SYSTEM FOR BULLDOZERS

TECHNICAL FIELD

The present invention relates to a dozing system for a bulldozer. More particularly, the invention relates to such techniques in dozing operation carried out with a bulldozer as control of loads which are applied to a blade by excavating and moving earth and ground leveling control by keeping the position of a cutting edge of the blade constant with respect to the ground.

BACKGROUND ART

Dozing operation by the use of a bulldozer has been previously performed in such a manner that: the operator who drives a bulldozer manually operates a blade to be lifted or lowered so as to keep loads applied to the blade by excavating and moving earth constant while eliminating running slip of a vehicle body (i.e., shoe slip) for the sake of efficiency on dozing operation and so as to level the ground with the position of a cutting edge of the blade being kept constant with respect to the ground.

However, the above-described manual operation for lifting or lowering a blade so as to keep loads on tile blade constant while eliminating shoe slip for the sake of efficiency on dozing operation and so as to level the ground with the position of a cutting edge of the blade being kept constant with respect to the ground presents the following disadvantages. Even if the operator is very skillful, he has to carry out lifting/lowering operation a number of times so that he will get significantly exhausted. Another disadvantage is that because the operation is very complicated, the unskilled operators, as a matter of course, will be significantly exhausted with fatigue, and the operation itself will be found as quite difficult to be carried out.

The prime object of the invention is therefore to provide a dozing system for a bulldozer with which dozing can be easily carried out by a simple operation, without causing a great deal of fatigue to the operator so that the foregoing problems can be overcome.

DISCLOSURE OF THE INVENTION in order to accomplish the above object, a dozing system for a bulldozer according to the invention comprises:

(a) running slip detector means for detecting the running slip of a vehicle body;

(b) actual tractive force detector means for detecting an actual tractive force of the vehicle body;

(c) comparison controller means for comparing the actual tractive force detected by the actual tractive force detector means with a target tractive force which has been preset, and controlling a blade such that the blade is lifted or lowered so as to make the actual tractive force coincident with the target tractive force when the running slip has not been detected by the running slip detector means and such that the blade is lifted so as to eliminate the running slip when the running slip has been detected by the running slip detector means.

According to the above system, when the running slip of the vehicle body is not detected by the running slip detector means, the comparison controller means controls the blade to be lifted or lowered in order to make an actual tractive force detected by the actual tractive force detector means coincident with a target tractive force preset by e.g., a dial, whereby loads applied to the blade by excavating and moving earth can be maintained constant. On the other hand, when the running slip is detected by the running slip detector means, the comparison controller means controls the blade to be lifted in order to reduce loads applied to the blade by excavating and moving earth, thereby eliminating the running slip.

Since the blade is automatically lifted or lowered such that loads applied to the blade by excavating and moving earth becomes coincident with the target tractive force while eliminating running slip so that the loads can be maintained constant, dozing operation no longer causes a great deal of fatigue to the operator and can be easily carried out by a simple operation. In addition, not only can the durability of the crawler belts be increased thanks to elimination of the running slip, but also high efficiency can be achieved since dozing operation is carried out with constant loads.

The comparison controller means may be arranged to perform lifting or lowering control of the blade such that the position of the cutting edge of the blade with respect to the ground is so maintained as to be a preset target cutting edge position, in addition to the lifting/lowering control of the blade performed in order to make the actual tractive force coincident with the target tractive force, when the running slip is not detected by the running slip detector means. In this case, leveling of the ground is carried out using the target cutting edge position set by means of a dial or the like as a reference position.

When the difference between the actual tractive force and the target tractive force is small, the comparison controller means may perform the blade lifting/lowering control for making the actual tractive force coincident with the target tractive force in preference to the blade lifting/lowering control for maintaining the position of the cutting edge of the blade with respect to the ground to be the target cutting edge position. With this arrangement, when dozing operation is carried out in a flat, gently rolling place where the difference between the actual tractive force and the target tractive force is small, loads applied to the blade by excavating and moving earth is kept constant while the running slip of the vehicle body being eliminated, so that the amount of work increases. On the other hand, when dozing is carried out in a rugged place where tractive force fluctuation in terms of distance and time is so great that there is a big difference between the actual tractive force and the target tractive force, the ground is leveled with the cutting edge of the blade being maintained at a constant position with respect to the ground, with the result that the ruggedness of the ground where excavation has been done can be reduced.

Detection of the running slip of the vehicle body may be performed by the running slip detector means, e.g. in any one of the following methods.

1. A pitch angle sensor for detecting a pitch angle of the vehicle body inclining in forward and backward directions is employed. The running slip is detected by deriving acceleration elements from the output of the pitch angle sensor by frequency separation. The output indicates the pitch angle of the vehicle body inclining back and forth, which varies every moment.

2. An acceleration sensor for detecting the accelerated condition of the vehicle body is employed. The running slip is detected from the output of the acceleration sensor.

3. A Doppler speed meter is employed. The running slip is detected by making comparison between an actual speed of the vehicle body measured by the Doppler speed meter and a running speed of the crawler belts for running the vehicle body.

Detection of the actual tractive force by the actual tractive force detector means is executed, e.g. in any one of the following methods.

1. An engine revolution sensor for detecting a revolution speed Ne of an engine and a torque convertor output shaft revolution sensor for detecting a revolution speed Nt of an output shaft of a torque convertor are employed. Speed ratio e (=Nt/Ne), which is the ratio of the engine revolution speed Ne detected by tile engine revolution sensor to the torque convertor output shaft revolution speed Nt detected by the torque convertor output shaft revolution sensor, is first obtained. Then, torque convertor output torque is obtained from the torque convertor characteristic of the torque convertor, using the speed ratio e. The torque convertor output torque is then multiplied basically by the reduction ratio between the output shaft of the torque convertor and sprockets for driving the crawler belts used for running the vehicle body, and accordingly the actual tractive force of the vehicle body is detected.

2. An engine revolution sensor for detecting a revolution speed of the engine is used when "lock-up" is selected in the torque convertor equipped with a lock-up mechanism or when a direct transmission is employed. Engine torque is obtained from the engine torque characteristic of the engine, using the revolution speed of the engine detected by the engine revolution sensor. Then, the engine torque is multiplied basically by the reduction ratio between the engine and the sprockets for driving the crawler belts used for running the vehicle body, and accordingly, the actual tractive force of the vehicle body is detected.

3. A driving torque sensor for detecting an amount of driving torque from the sprockets for driving the crawler belts used for running the vehicle body is employed. The actual tractive force of the vehicle body is detected on the basis of the amount of driving torque detected by the driving torque sensor.

4. A bending stress sensor for detecting an amount of bending stress generated at trunnions that are joints between straight frames for supporting the blade and the vehicle body is employed. The actual tractive force of the vehicle body is detected on the basis of the amount of bending stress detected by the bending stress sensor.

The actual tractive force detector means may be provided with a pitch angle sensor for detecting a pitch angle of the vehicle body inclining in forward and backward directions and the actual tractive force which has been detected may be corrected in accordance with the pitch angle detected by the pitch angle sensor. This arrangement allows loads applied to the blade by excavating and moving earth to be maintained constant irrespective of running resistance which is dependent on the pitch angle of the vehicle body, in other words, the slope of the place where the vehicle runs.

The pitch angle sensor provided in the actual tractive force detector means may be also used as a pitch angle sensor of the running slip detector means.

Preferably, the automatic driving control of the blade For dozing operation carried out by the comparison controller means is performed when the automatic driving mode is selected and a first forward speed or a second forward speed is selected but not performed when the blade is in manual operation even if the automatic driving mode is selected and a first forward speed or a second forward speed is selected. This arrangement makes it possible to perform automatic driving only when a speed suitable for dozing operation such as the first forward speed or second forward speed is selected in the automatic driving mode. Manual operation of the blade is carried out in preference to automatic driving operation and, therefore, can be performed any time at will, being inserted during automatic driving operation.

BRIEF DESCRIPTION OF DRAWINGS

FIG. 1 is an external appearance of the bulldozer;

FIG. 2 is a skeleton diagram of a power transmission system;

FIG. 3 is a schematic block diagram of an overall construction;

FIGS. 5 to 11 are a graph showing a curved engine characteristic map; graph showing a pump correction characteristic map; graph showing a curved torque converter characteristic map; graph showing a pitch angle-load correction value characteristic map; graph showing a load control characteristic map; graph showing a ground leveling control characteristic map; and graph showing a load-ground leveling control weighted characteristic map, respectively.

BEST MODE FOR CARRYING OUT THE INVENTION

With reference to the drawings, a dozing system for a bulldozer according to a preferred embodiment of the invention will be hereinafter described.

Figure 1:
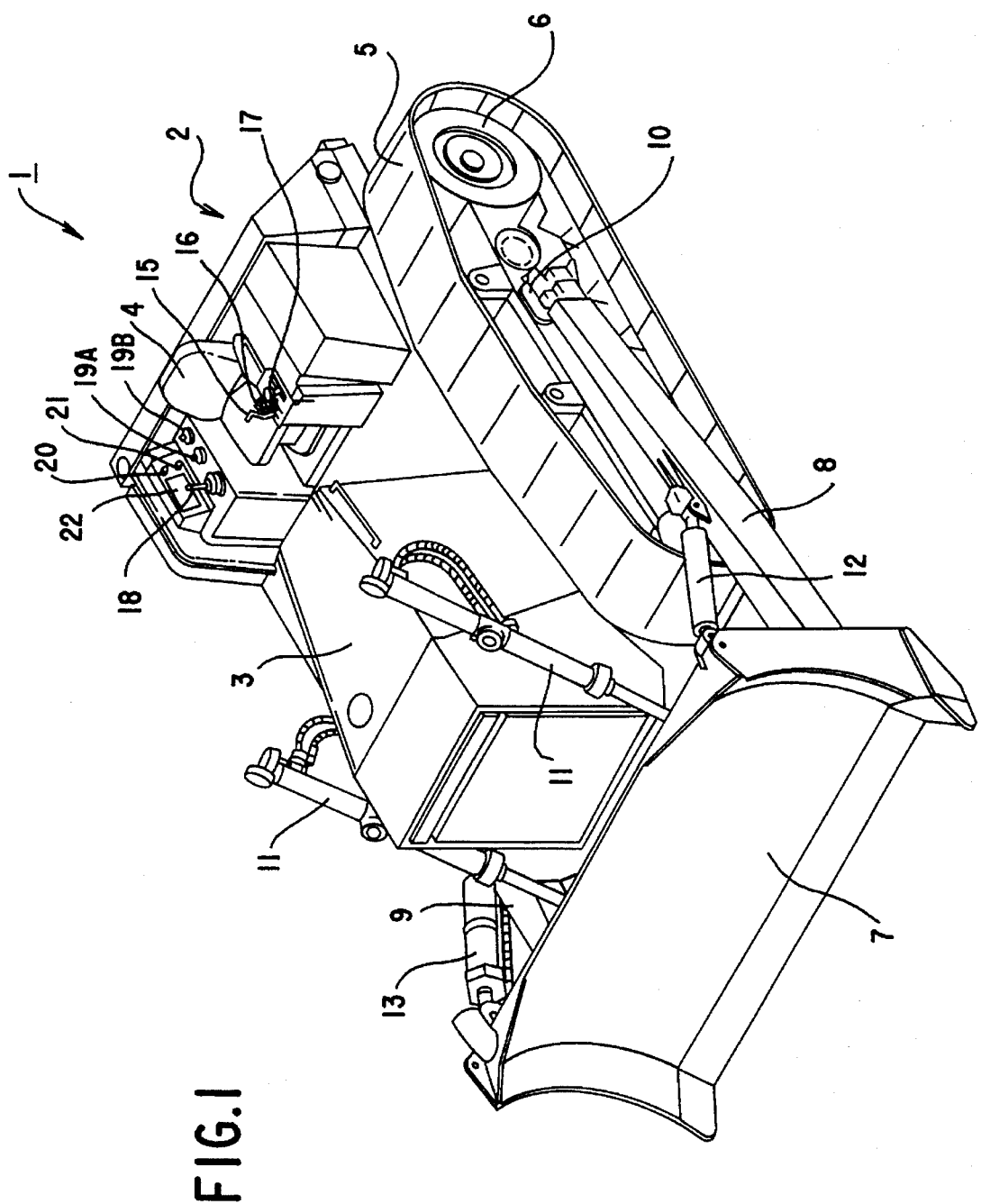
FIGS. 1 to 11 are for explaining a dozing system for a bulldozer according to a preferred embodiment of the invention.

Referring to FIG. 1, there is shown an external appearance of a bulldozer 1 which is provided with, on a vehicle body 2 thereof, a bonnet 3 for housing an engine (not shown) and an operator seat 4 for the operator who drives the bulldozer 1. Both sides (i.e., the right and left sides when the vehicle body 2 is viewed in its moving direction) of the vehicle body 2 are provided with crawler belts 5 (the crawler belt on the right side is not shown) for running the vehicle body 2 so as to turn or move back and forth. These crawler belts 5 are independently driven by their respective corresponding sprockets 6 actuated by driving force transmitted from the engine.

There are provided straight frames 8, 9 for supporting a blade 7 at the forward ends thereof. The base ends of these right and left straight frames 8, 9 are pivotally supported at the right and left sides of the vehicle body 2 by trunnions 10 (the trunnion at the right side is not shown) in such a manner that the blade 7 can be lifted or lowered. Disposed between the blade 7 and the vehicle body 2 are right and left blade lift cylinders 11 forming a pair for lifting or lowering the blade 7. A brace 12 is disposed between the blade 7 and the left straight frame 8 and a blade tilt cylinder 13 is disposed between the blade 7 and the right straight frame 9. The brace 12 and the blade tilt cylinder 13 function to incline the blade 7 to the right and left.

There are provided a steering lever 15, a transmission shift lever 16 and a fuel control lever 17 on the left of the operator seat 4 when the vehicle body 2 is viewed in its moving direction. On the right of the operator seat 4, there are provided a blade control lever 18 for lifting, lowering the blade 7 and inclining it to the right and left; a first dial switch 19A for setting the magnitude of loads applied to the blade 7 by excavating and moving earth and a second dial switch 19B for compensating for the set magnitude of loads by addition or subtraction of a correction value; an automatic driving mode pressing selector switch 20 for switching ON/OFF of the automatic driving mode for dozing operation; a lock,up selector switch 21 for switching ON/OFF of the lock-up of a torque convertor; and a display unit 22.

Although it is not shown in the drawing, there is provided a decelerator pedal in front of the operator seat 4.

Figure 2:
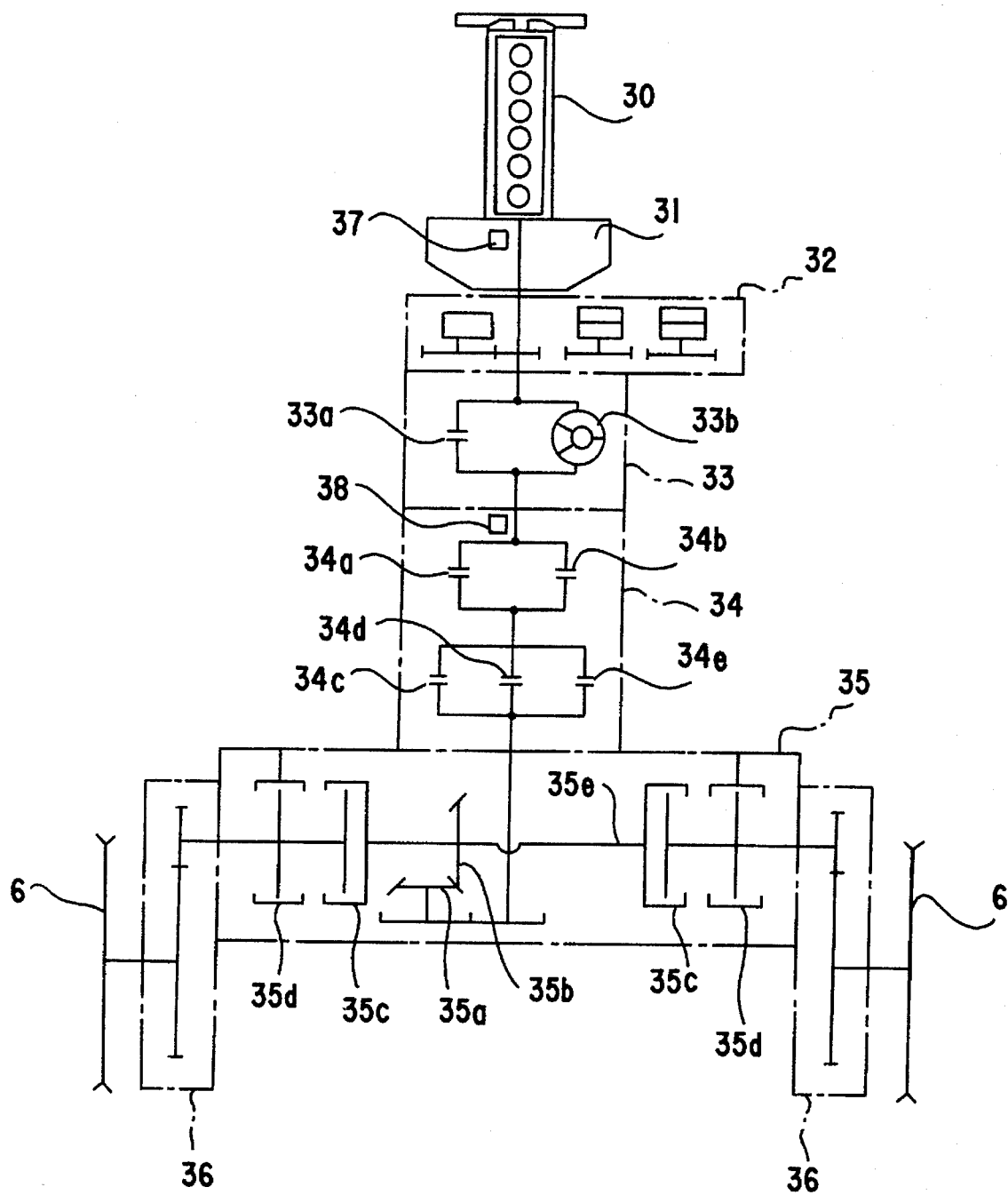

Referring to FIG. 2 which shows a power transmission system, a rotary driving force from an engine 30 is transmitted to a torque convertor with a lock-up mechanism 33 through a damper 31 and a PT0 32. The torque convertor with a lock-up mechanism 33 includes a lock-up mechanism 33a and a pump 33b, and the PT0 32 functions to drive various hydraulic pumps including hydraulic pumps for operational machines. The rotary driving force is then transmitted from an output shaft of the torque convertor with a lock-up mechanism 33 to a transmission 34 such as e.g., a planetary gear lubricated multiple-disc clutch transmission, an input shaft of which is connected to the above output shaft. The transmission 34 includes forward and reverse clutches 34a, 34b and first to third clutches 34c to 34e so that the revolution of the output shaft of the transmission 84 can be shifted in three stages in both forward and backward directions. The rotary driving force from the output shaft of the transmission 34 is transmitted to a steering mechanism 35 that includes a transverse shaft 35e on which disposed are a pinion 35a, bevel gear 35b, right and left steering clutches 35c forming a pair, and right and left steering brakes 35d forming a pair. Thereafter, the rotary driving force is transmitted to a pair of final reduction mechanisms 36 disposed on the right and eft hands so that each of the sprockets 6 for running the crawler belts 5 is driven. Note that Reference numeral 37 denotes an engine revolution sensor for detecting the revolution speed of the engine 30 and Reference numeral 38 denotes a torque convertor output shaft revolution sensor for detecting the revolution speed of the output shaft of the torque convertor with a lock-up mechanism 33.

Figure 3:
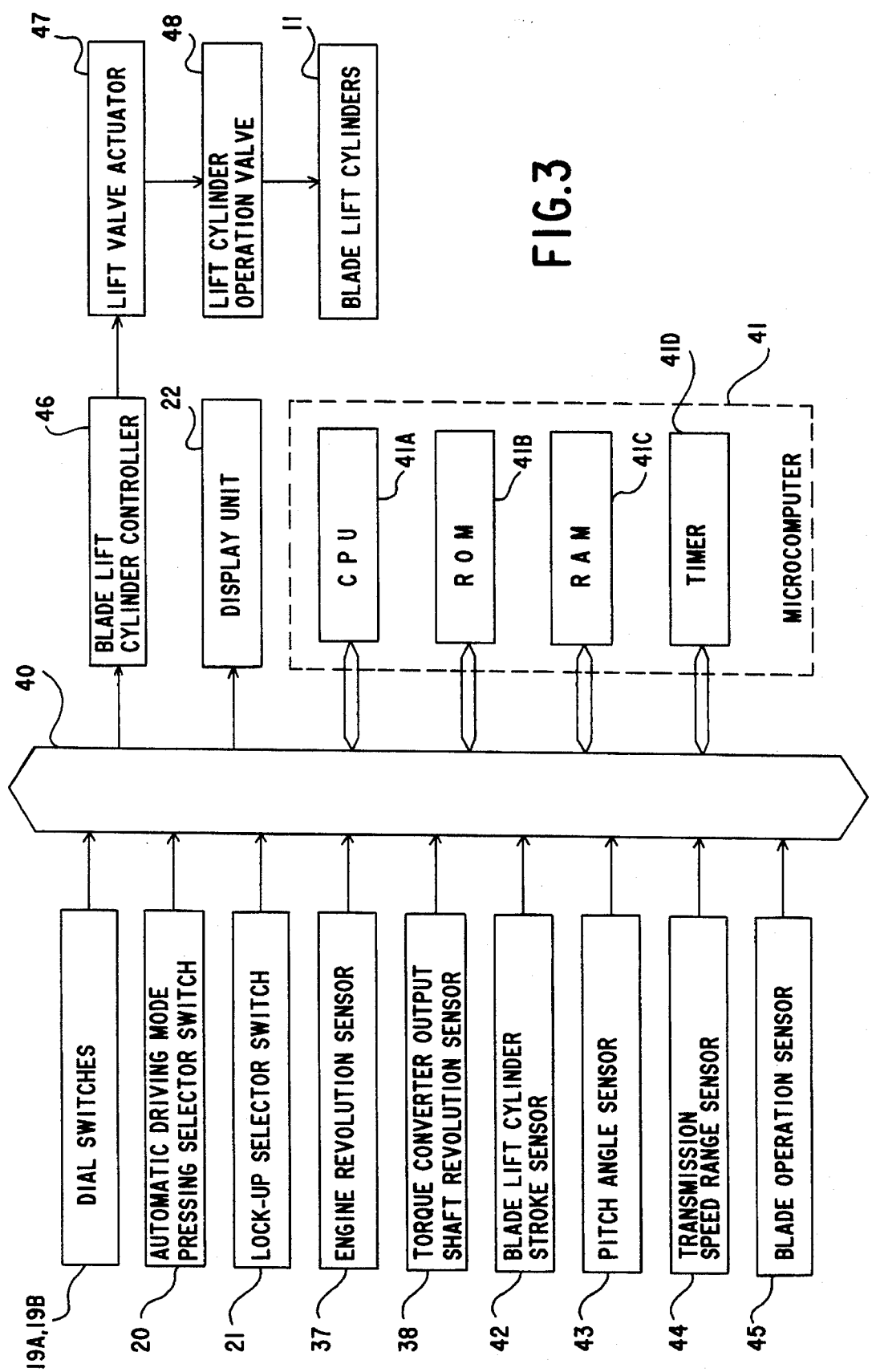

Referring to FIG. 3 which schematically shows the overall construction of the dozing system for a bulldozer of the invention, the following data items are supplied to a microcomputer 41 through a bus 40: (i) dial value data sent from the first dial switch 19A, for informing the magnitude of loads applied to the blade 7 by excavating and moving earth, the magnitude being set by the first dial switch 19A; (ii) dial value data sent from the second dial switch 19B, for informing a correction value to be added to or subtracted from the set value of the magnitude of loads; (iii) an automatic/manual driving mode instruction sent from the automatic driving mode pressing selector switch 20, for informing whether the automatic driving mode for dozing operation has been selected; (iv) a lock-up (L/U)/torque converting (T/C) instruction sent from the lock-up selector switch 21, for informing whether the lock-up of the torque convertor with a lock-up mechanism 33 has been selected; (v) revolution speed data sent from the engine revolution sensor 37, for informing the revolution speed of the engine 30; and (vi) revolution speed data sent from the torque convertor output shaft revolution sensor 38, for informing the revolution speed of the output shaft of the torque convertor with a lock-up mechanism 33. The following data are also supplied to the microcomputer 41 through the bus 40: (i) stroke positional data sent from a blade lift cylinder stroke sensor 42 that detects the respective stroke positions of the right and left blade lift cylinders 11 for lifting and lowering the blade 7; (ii) tilt angle data sent from a tilt angle sensor 43 that detects the varying tilt angle of the vehicle body 2 inclining back and forth in every movement; (iii) speed range data sent from a transmission speed range sensor 44 that detects a speed range condition of the transmission 34, more specifically, which of three speed ranges in forward and reverse has been selected by changing the gears through the operation of the transmission shift lever 16; and (iv) manual driving operation data from a blade operation sensor 45 that detects whether the blade 7 is set in manual driving operation carried out by the blade control lever 18.

The microcomputer 41 is composed of a central processing unit (CPU) 41A for executing a specified program; a read only memory (ROM) 41B for storing the above program and various maps such as a curved engine characteristic map and curved torque convertor characteristic map; a random access memory (RAM) 41C serving as a working memory necessary for executing the program and as registers for various data; and a timer 41D for measuring elapsed time for an event in the program. The program is executed in accordance with (i) the dial value data on the magnitude of loads applied to the blade 7 by excavating and moving earth; (ii) the dial value data on a correction value to be added to or subtracted from the value of the magnitude of loads; (iii) the automatic/manual driving mode instruction for dozing operation; (iv) the (L/U)/(T/C) instruction for the torque convertor with a lock-up mechanism 33; (v) the revolution speed data on the engine 30; and (vi) the revolution speed data on the output shaft of the torque convertor with a lock-up mechanism 33; (vii) the respective stroke positional data on the right and left blade lift cylinders 11; (viii) the pitch angle data on the vehicle body 2 inclining back and forth; (ix) the speed range data on the gear condition of the transmission 34; and (x) the manual driving operation data on the blade 7. Then, the amount of lift operation for lifting or lowering the blade 7 is supplied to a blade lift cylinder controller 46, and the right and left blade lift cylinders 11 are driven based on the lift operation amount by means of the controller 46 with the help of a lift valve actuator 47 and a lift cylinder operation valve 48, whereby the blade 7 is lifted or lowered. The display unit 22 displays such information as whether dozing operation by the bulldozer 1 is presently in the automatic driving mode or manual driving mode.

Figure 4A:
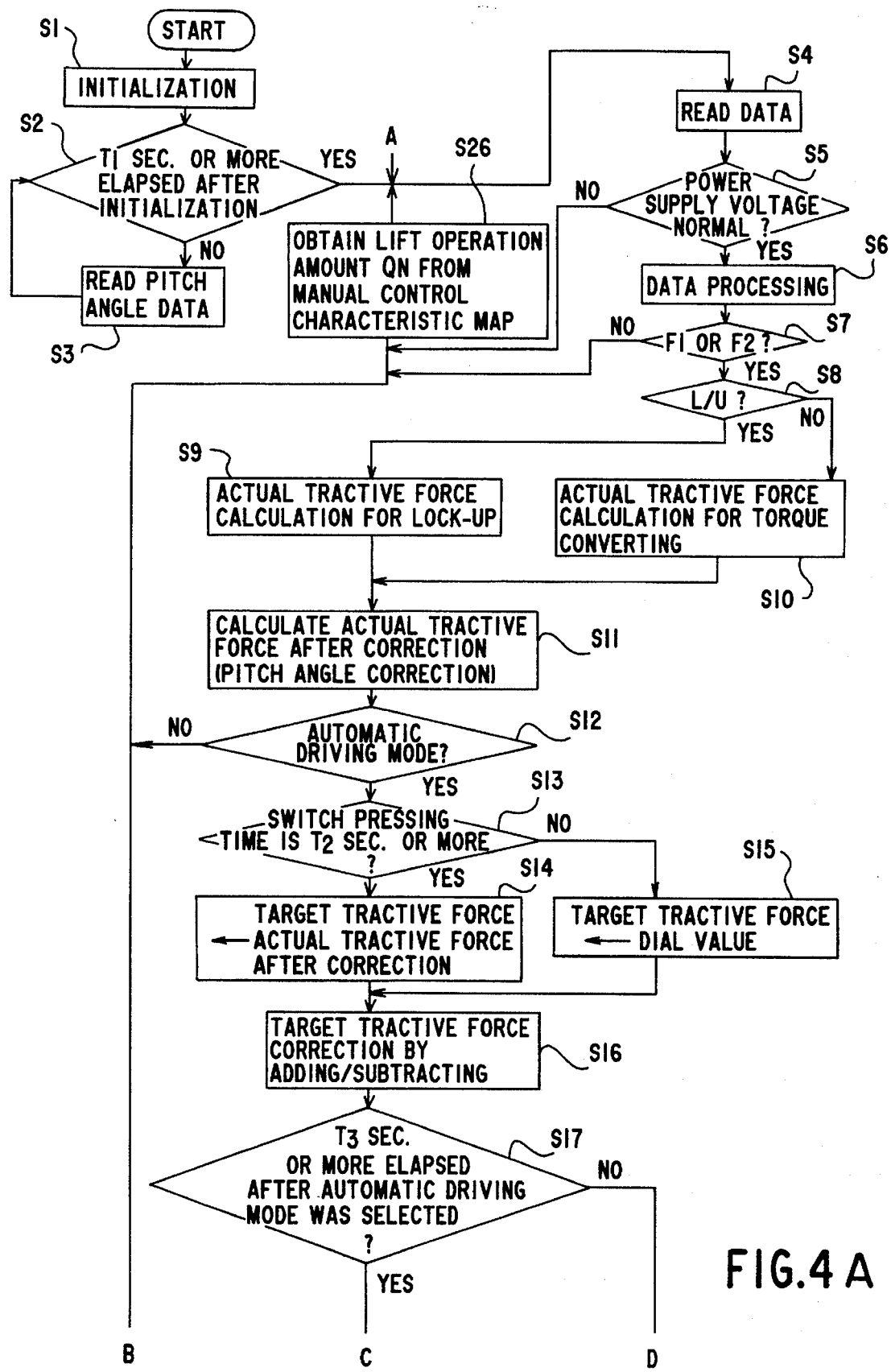
FIGS. 4A and B are a flowchart of a dozing program.
Figure 4B:
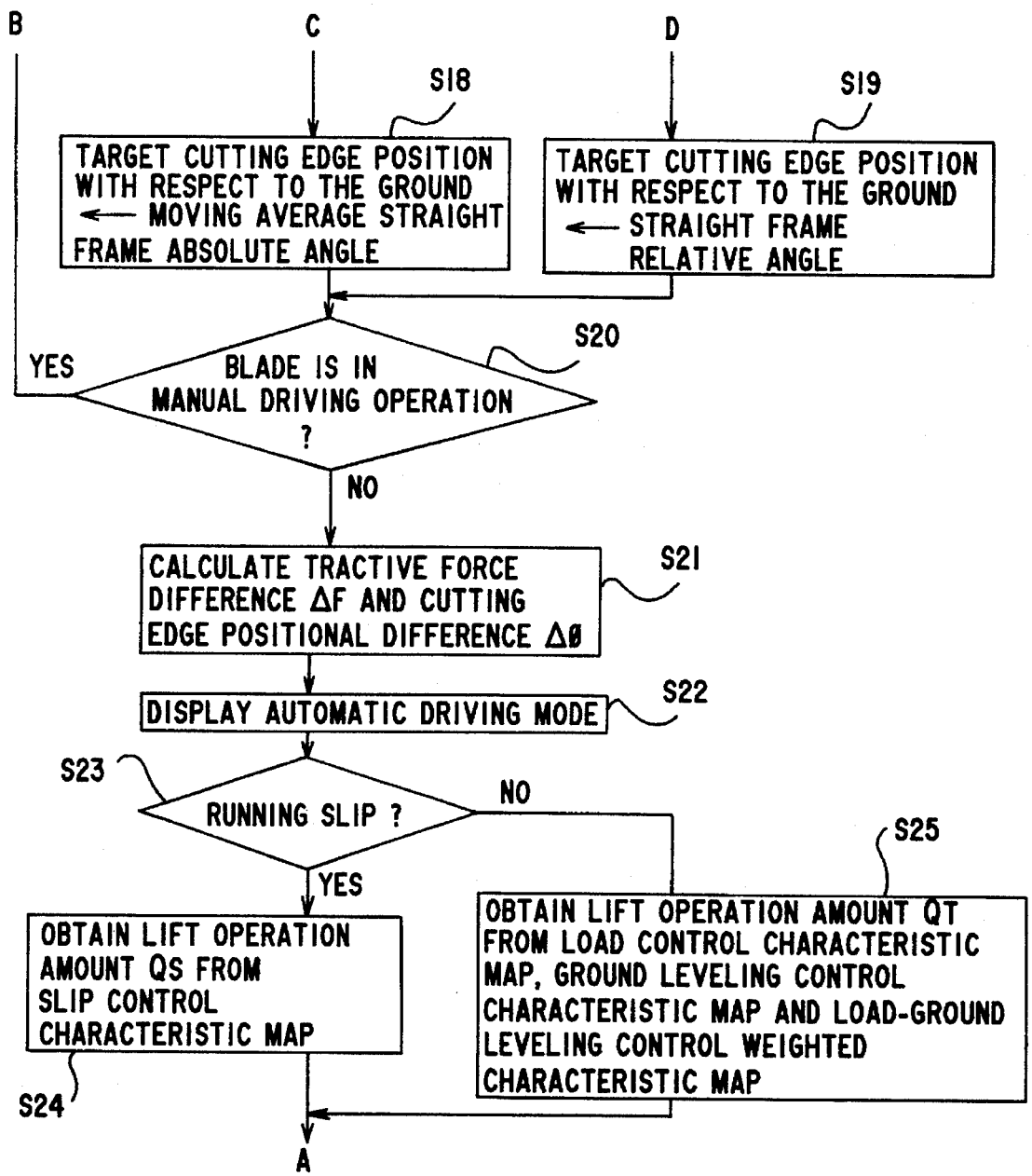

Now reference is made to the flowchart of FIG. 4 for explaining, in detail, the performance of the dozing system for a bulldozer having the above-described arrangement.

Step 1 to Step 3: Power is loaded to start the execution of the specified program and clear all the data of the registers in the RAM 41C. At the same time, initialization such as resetting of various timers in the timer 41D is executed. For $t_1$ seconds after the initialization, pitch angle data are sequentially read from the pitch angle sensor 43 as initial values. The reason why pitch angle data are sequentially read as initial values is that the pitch angle of the vehicle body 2 is obtained by frequency separation using the moving averages of the pitch angle data.

Step 4 to Step 6: The following data are firstly read. (i) the dial value data from the first dial switch 19A, for informing the magnitude of loads applied to the blade 7 by excavating and moving earth, the value of the magnitude being set by the first dial switch 19A; (ii) the dial value data from the second dial switch 19B, for informing a correction value to be added to or subtracted from the set value of the magnitude of loads; (iii) the automatic/manual driving mode instruction for dozing operation from the automatic driving mode pressing selector switch 20; (iv) the (L/U)/(T/C) instruction for the torque convertor with a lock-up mechanism 33 from the lock-up selector switch 21; (v) the revolution speed data from the engine revolution sensor 37, informing the revolution speed of the engine 30; and (vi) the revolution speed data from the torque convertor output shaft revolution sensor 38, informing the revolution speed of the output shaft of the torque convertor with a lock-up mechanism 33; (vii) the stroke positional data from the blade lift cylinder stroke sensor 42 for informing the respective stroke positions of the right and left blade lift cylinders 11; (viii) the pitch angle data from the pitch angle sensor 43 for informing the pitch angle of the vehicle body 2 inclining back and forth; (ix) the speed range data from the transmission speed range sensor 44, for informing the gear condition of the transmission 34; and (x) the manual driving operation data from the blade operation sensor 45, for informing whether the blade 7 is set in manual driving operation. Then, if the voltage of the power source is normal, i.e., more than a specified value and the electronic circuit is in a normal condition, the following data processing is executed.

1. Low frequency elements are derived from the sequentially read pitch angle data by frequency separation, utilizing the method of moving averages, whereby the pitch angle of the vehicle body 2 is obtained.

2. Then, acceleration elements are derived by frequency separation, specifically, by subtracting the above low frequency elements from the pitch angle data sequentially read, whereby the acceleration of the vehicle body 2 is obtained.

3. Based on data obtained by averaging the data on the respective stroke positions of the right and left blade lift cylinders 11, a straight frame relative angle $\phi_1$, which is the average of the angles of the right and left straight frames 8, 9 to the vehicle body 2, is obtained.

4. From the straight frame relative angle $\phi_1$ and the pitch angle of the vehicle body 2 thus obtained, a straight frame absolute angle, which is the average of the angles of the right and left straight frames 8, 9 to the ground, is obtained. Then, a moving average straight frame absolute angle $\phi_2$ is obtained by the method of moving averages in which the straight frame absolute angle which varies every moment is observed for 5 seconds.

Step 7 to Step 11: When the speed range condition (gear condition) of tile transmission 34 is the first forward speed F1 or the second forward speed F2, an actual tractive force $F_R$ is calculated in either of the following methods selected depending on whether the (L/U)/(T/C) instruction for the torque converter with a lock-up mechanism 33 is 37 lock-up" or "torque converting".

1. "Lock-up"

Figure 5:
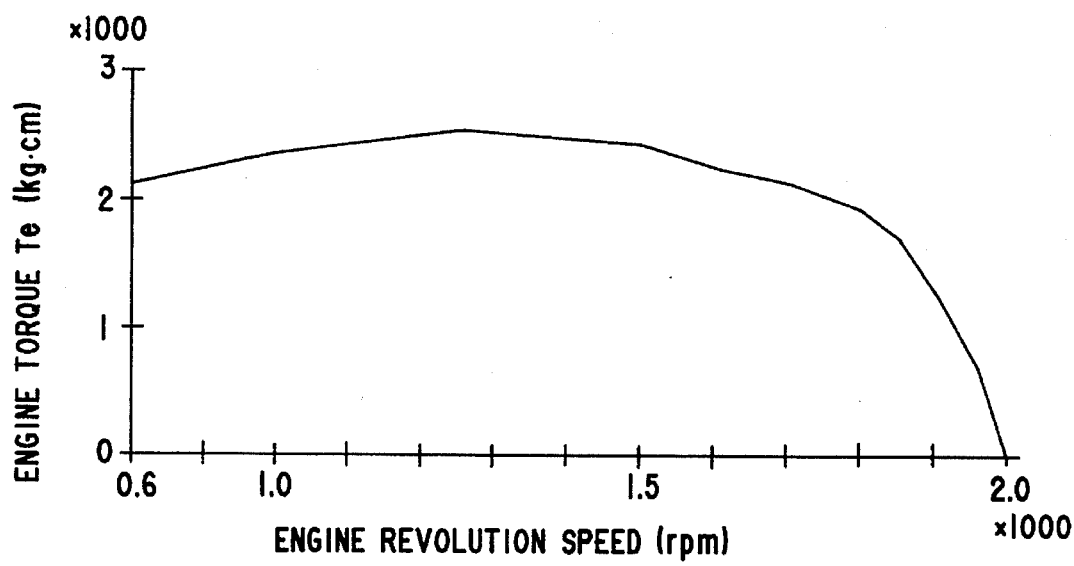
Figure 6:
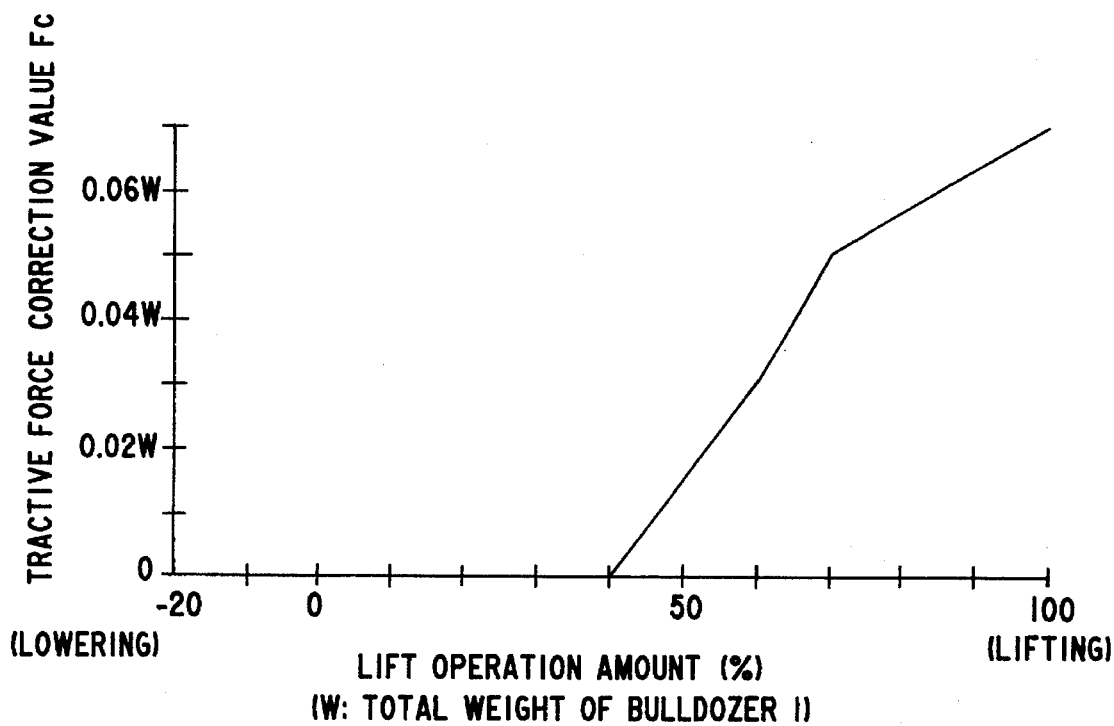

An engine torque Te is obtained from the curved engine characteristic map shown in FIG. 5, using the revolution speed Ne of the engine 30. Then, the engine torque Te is multiplied by a reduction ratio $k_{se}$ provided over the range of the transmission 34, the steering mechanism 35 and the final reduction mechanisms 36 (in other words, the reduction ratio $k_{se}$ between the output shaft of the torque convertor with a lock-up mechanism 33 and the sprockets 6) and further nultiplied by the diameter r of tile sprockets 6, to thereby obtain a tractive force Fe ($=Te \times k_{se} \times r$). A tractive force correction value Fe is subtracted from the tractive force Fe, thereby obtaining the actual tractive force $F_R$ (=Fe−Fc). The tractive force correction value Fc corresponds to the use of the hydraulic pumps for operational machines including the hydraulic pump working on the blade lift cylinders 11 in the PTO 32 and can be obtained from the pump correction characteristic map shown in FIG. 6, using the lift operation amount of the blade 7.

2. "Torque converting"

Figure 7:
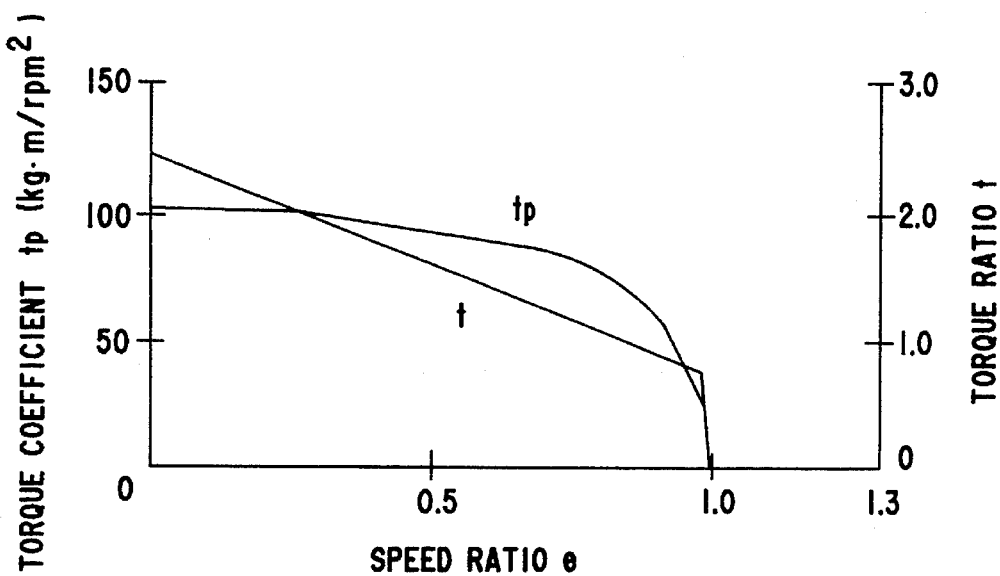

A torque coefficient $t_p$ and torque ratio t are obtained from the curved torque convertor characteristic map shown in FIG. 7, using the speed ratio e (=Nt/Ne) that is the ratio of the revolution speed Ne of the engine 30 to the revolution speed Nt of the output shaft of the torque convertor with a lock-up mechanism 33, and then a torque convertor output torque Tc ($=t_p \times (Ne/100)^2 \times t$) is obtained. Similarly to the case 1, the torque convertor output torque Tc is multiplied by the reduction ratio $k_{se}$ between the output shaft of the torque convertor with a lock-up mechanism 33 and the sprockets 6 and further multiplied by the diameter r of the sprockets 6, to thereby obtain the actual tractive force $F_R$ (=Tc×$k_{se}$×r).

Figure 8:
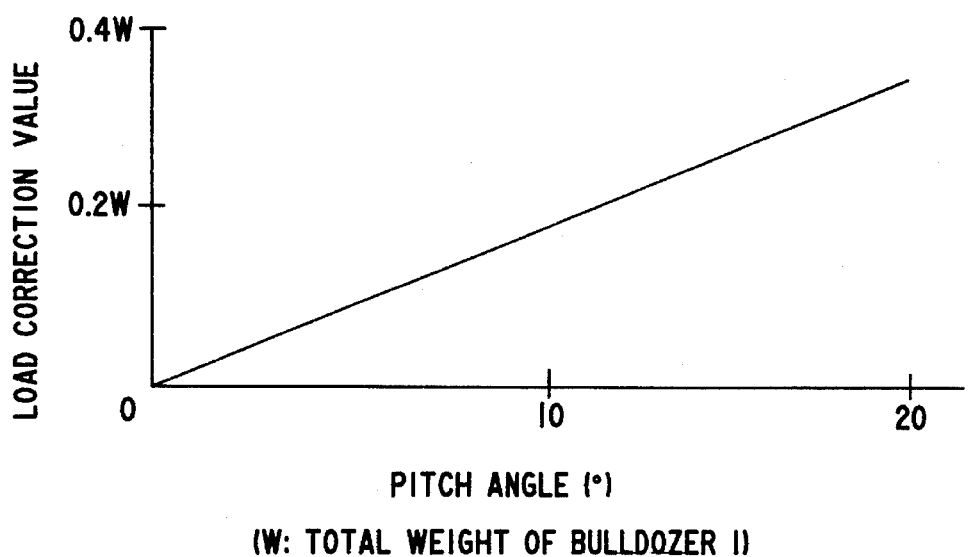

A load correction value which corresponds to the pitch angle of the vehicle body 2 and can be obtained from the pitch angle-load correction value characteristic map shown in FIG. 8, is subtracted from the actual tractive force $F_R$ thus obtained, thereby obtaining an actual tractive force after correction F.

Step 12 to Step 16: If the automatic/manual driving mode instruction for the automatic driving mode pressing selector switch 20 indicates the automatic driving mode of dozing operation, the following steps will be taken.

1. If a pressing time for operating the automatic driving mode pressing selector switch 20 is $t_2$ seconds or more, the actual tractive force after correction F is set as a target tractive force Fo.

2. If the pressing time for operating the automatic driving mode pressing selector switch 20 is less than $t_2$ seconds, a dial value set by the first dial switch 19A, corresponding to the magnitude of loads applied to the blade 7 by excavating and moving earth is set as the target tractive force Fo.

Then, the target tractive force Fo which has been set is corrected by adding or subtracting a dial value of the second dial switch 19B and is renewed, the dial value being a correction value for the magnitude of loads set by the first dial switch 19A.

Step 17 to Step 19: If the automatic/manual driving mode instruction for the automatic driving mode pressing selector switch 20 indicates the automatic driving mode of dozing operation and $t_3$ seconds or more have elapsed after the automatic driving mode was selected by the above instruction, the moving average straight frame absolute angle $\phi_2$ is set as a target cutting edge position $\phi_0$ with respect to the ground for the cutting edge of the blade 7. On the other hand, when less than $t_3$ seconds have elapsed, the straight frame relative angle $\phi_1$ is set as the target cutting edge position $\phi_0$ with respect to the ground for the cutting edge of the blade 7.

Step 20 to Step 22: When the dozing operation is not in the manual driving operation, that is, the blade 7 is not manually operated by the blade control lever 18, the tractive force difference ΔF between the target tractive force Fo and the actual tractive force after correction F as well as the positional difference Δ$\phi$ between the target cutting edge position $\phi_0$ with respect to tile ground and the moving average straight frame absolute angle $\phi_2$ are obtained. In the meantime, the display unit 22 indicates that the dozing operation is in the automatic driving mode.

Step 23 to Step 25: From moving average acceleration obtained by applying the method of moving averages to the acceleration of the vehicle body 2 which has been obtained from the acceleration elements derived from the pitch angle data by frequency separation and the actual tractive force after correction F, shoe slip (i.e., the running slip of the vehicle body 2) is detected as running slip. The detection is judged based on the following conditions.

1. If either of the following conditions is satisfied, the occurrence of running slip is admitted.

(1°≈0.0174 G, W: the total weight of the bulldozer 1)

(1) the moving average acceleration α<−4°

(2) the moving average acceleration α<−2° and the actual tractive force after correction F>0.6 W 2. If either of the following conditions is satisfied, it is admitted that after occurring, running slip has topped.

(1) the moving average acceleration α>0.1° or
(2) the actual tractive force after correction F> the actual tractive force after correction at the time of the start of running slip F−0.1 W After judging whether or not running slip has occurred based on the foregoing conditions, either of the following steps will be taken in accordance with the judgment.

1. If it is judged that running slip has occurred, a lift operation amount $Q_S$ for lifting the blade 7 is obtained from a slip control characteristic map (not shown) in order to eliminate the running slip by reducing loads applied to the blade 7 by excavating and moving earth.

2. If it is judged that no running slip has been detected, lift operation amounts $Q_1$ and $Q_2$ are obtained in the following ways.

Figure 9:
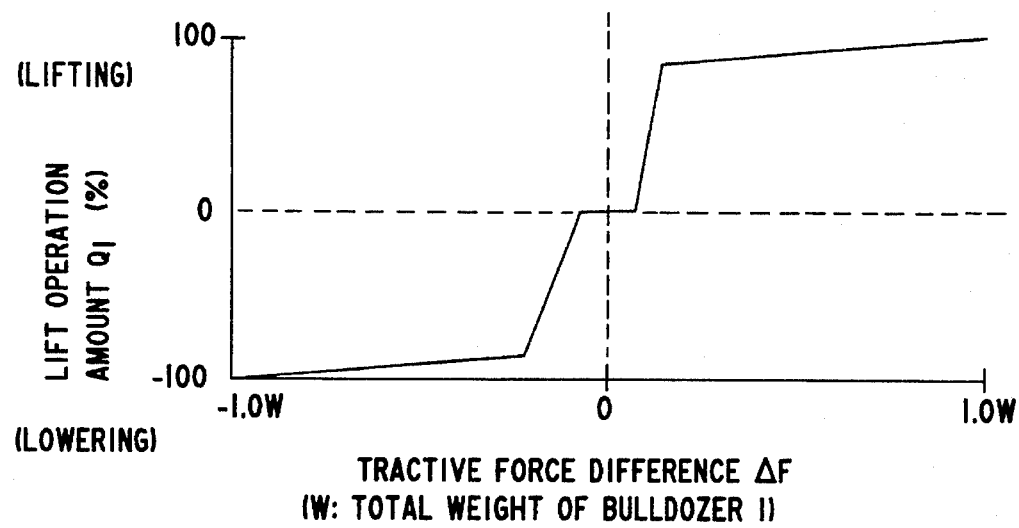

(1) Using the tractive force difference ΔF between the target tractive force Fo and the actual tractive force after correction F, the lifting amount $Q_1$ for lifting or lowering the blade 7 such that the actual tractive force after correction F becomes coincident with the target tractive force Fo is obtained from a load control characteristic map shown in FIG. 9.

Figure 10:
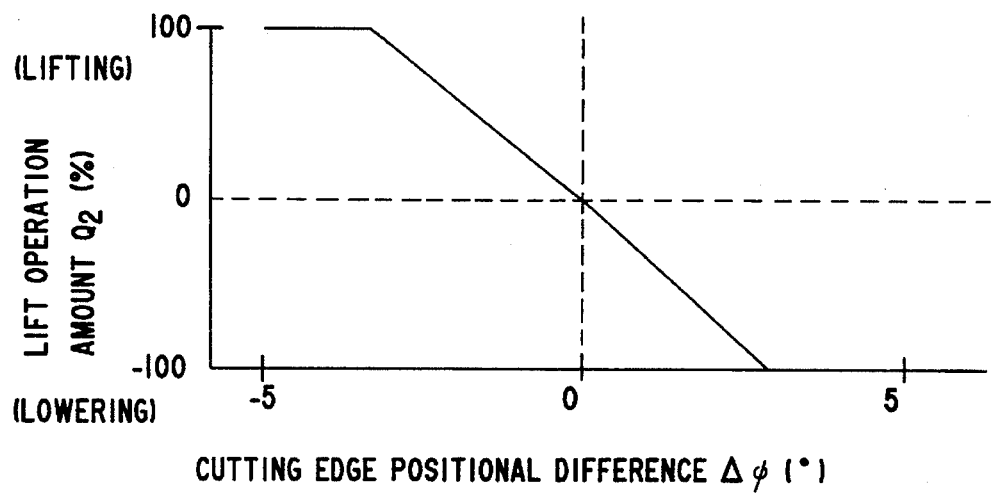

(2) Using the positional difference Δφ between the target cutting edge position with respect to the ground $φ_0$ and the moving average straight frame absolute angle $φ_2$, the lift operation amount $Q_2$ for lifting or lowering the blade 7 such that the moving average straight frame absolute angle $φ_2$ becomes coincident with the target cutting edge position with respect to the ground $φ_0$ from a ground leveling control characteristic map shown in FIG. 10.

Figure 11:
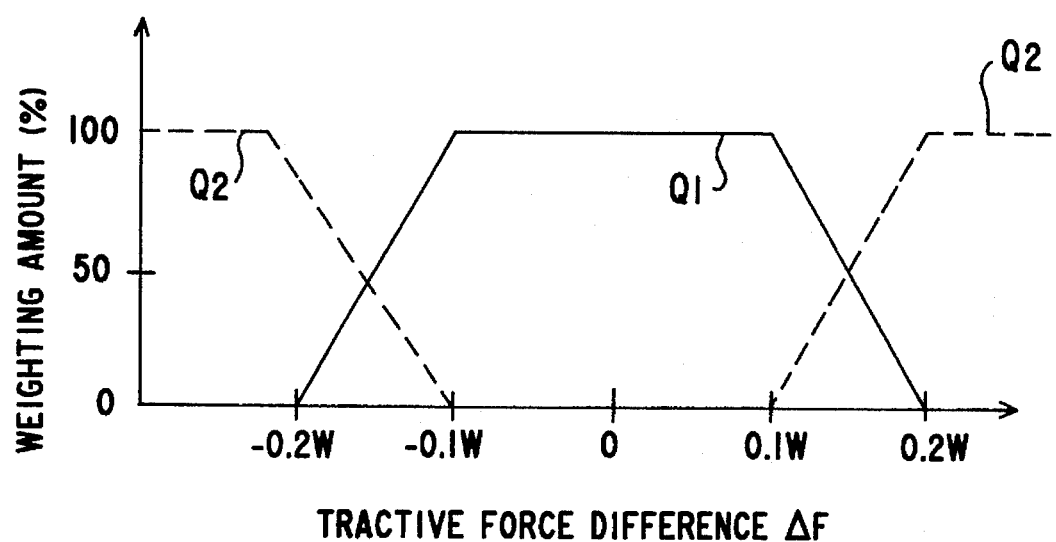

(3) Then, the lift operation amounts $Q_1$, $Q_2$ are weighted in accordance with a load-ground leveling control weighted characteristic map shown in FIG. 11, using the tractive force difference ΔF, whereby a lift operation amount $Q_T$ is obtained. According to the weighted map, when the tractive force difference ΔF is within the range of ±0.1 W, the load control is performed in preference to the ground leveling control.

When the voltage of the power source is not normal, being less than the specified value and the electronic circuit functions abnormally; when the transmission 34 is in other speed range conditions (gear conditions) than the first forward speed F1 or the second forward speed F2; when the automatic/manual driving mode instruction for the automatic driving mode pressing selector switch 20 indicates the manual driving mode of dozing operation; or when the operation is the manual driving operation that the blade 7 is manually controlled with the blade control lever 18, a lift operation amount $Q_N$ for lifting or lowering the blade 7 is obtained from a manual control characteristic map (not shown), according to the operation amount of the blade control lever 18 in Step 26.

The above-mentioned lift operation amounts $Q_S$, $Q_T$ and $Q_N$ are supplied to the blade lift cylinder controller 46 which actuates the blade lift cylinders 11 through the lift valve actuator 47 and the lift cylinder operation valve 48 in accordance with the lift operation amounts $Q_S$, $Q_T$ and $Q_N$, thereby performing a desired control in lifting or lowering of the blade 7.

Although the actual tractive force is obtained by calculation in the foregoing embodiment, it could be obtained in other ways: for example, a driving torque sensor for detecting the driving torque of the sprockets 6 is employed and the actual tractive force is obtained based on the amount of driving torque detected by the driving torque sensor. Another alternative is that a bending stress sensor for detecting the amount of bending stress generated at the trunnions 10 by the straight frames 8, 9 for supporting the blade 7 is employed and the actual tractive force is obtained based on the amount of bending stress detected by the bending stress sensor.

In the foregoing embodiment, the invention has been particularly described with the power transmission system equipped with the torque convertor having a lock-up mechanism, but the invention is not necessarily limited to this as it may be applied to cases where a torque convertor having no lock-up mechanism or a direct transmission having no torque convertor is employed. When such a direct transmission is employed, the actual tractive force is calculated in the same way as described in the case of "lock-up" in the foregoing embodiment.

Further, in the embodiment, the running slip of the vehicle body 2 is detected by deriving acceleration elements from the pitch angle data output from the pitch angle sensor 43 by frequency separation, it may be detected from the output of an independent acceleration sensor, the output indicating the accelerated condition of the vehicle body 2. Alter-natively, a Doppler speed meter is employed and the running slip is detected by comparing the actual speed of the vehicle body 2 measured by the Doppler speed meter with the traveling speed of the crawler belts 5 for running the vehicle body 2.

Although the target cutting edge position with respect to the ground is set by calculation in the foregoing embodiment, it may be set by a dial switch similarly to the case of the target tractive force.

We claim:

1. A dozing system for a bulldozer comprising:

(a) running slip detector means for detecting the running slip of a vehicle body;

(b) actual tractive force detector means for detecting an actual tractive force of the vehicle body, said vehicle body having an operable blade, and said tractive force being a force applied to the blade of the vehicle body; and (c) comparison controller means, operably coupled to said running slip detector means and said actual tractive force detector means, for comparing the actual tractive force detected by the actual tractive force detector means with a target tractive force which has been preset, and (i) for controlling a blade such that the blade is lifted or lowered so as to make the actual tractive force coincident with the target tractive force, controlling the blade by lifting or lowering the blade such that a position of a cutting edge of the blade with respect to the ground is maintained to be a preset target cutting edge position with respect to the ground, and performing the control by making the actual tractive force coincident with the target tractive force in preference to the control for maintaining the position of the cutting edge of the blade with respect to the ground to be the target cutting edge position with respect to the ground, especially when the difference between the actual tractive force and the target tractive force is small when the running slip has not been detected by the running slip detector means, and (ii) for controlling the blade to be lifted so as to eliminate the running slip when the running slip has been detected by the running slip detector means.

2. The dozing system for a bulldozer as claimed in claim 1, wherein the comparison controller means performs lifting or lowering of the blade such that the position of a cutting edge of the blade with respect to the ground is maintained to be a preset target cutting edge position with respect to the ground, in addition to the lifting/lowering control of the blade performed in order to make the actual tractive force coincident with the target tractive force, when the running slip is not detected by the running slip detector means.

3. The dozing system for a bulldozer as claimed in claim 2, wherein when the difference between the actual tractive force and the target tractive force is small, the comparison controller means performs the blade lifting/lower control for making the actual tractive force coincident with the target tractive force in preference to the blade lifting/lowering control for maintaining the position of the cutting edge of the blade with respect to the ground to be the target cutting edge position with respect to the ground.

4. The dozing system for a bulldozer as claimed in one of claim 1, wherein the running slip detector means includes a pitch angle sensor for detecting a pitch angle of the vehicle body inclining in forward and backward directions and the running slip of the vehicle body is detected by deriving acceleration elements by frequency separation from output of the pitch angle sensor which is sequentially released therefrom, wherein the output indicating the pitch angle of the vehicle body which varies every moment.

5. The dozing system for a bulldozer as claimed in one of claim 1, wherein the running slip detector means includes an acceleration sensor and the running slip of the vehicle body is detected from the output of the acceleration sensor which indicates the accelerated condition of the vehicle body.

6. The dozing system for a bulldozer as claimed in one of claim 1, wherein the running slip detector means includes a Doppler speed meter and the running slip of the vehicle body is detected by comparing the actual speed of the vehicle body measured by the Doppler speed meter with the traveling speed of crawler belts for running the vehicle body.

7. The dozing system for a bulldozer as claimed in one of claim 1, wherein the actual tractive force detector means includes an engine revolution sensor for detecting a revolution speed Ne of an engine and a torque convertor output shaft revolution sensor for detecting a revolution speed Nt of an output shaft of a torque convertor, and the actual tractive force of the vehicle body is detected by such a calculation that: a speed ratio e (=Nt/Ne), which is the ratio of the engine revolution speed Ne detected by the engine revolution sensor to the torque convertor output shaft revolution speed Nt detected by the torque convertor output shaft revolution sensor, is first obtained; torque convertor output torque is obtained from the torque convertor characteristic of the torque convertor, using the speed ratio e; and the torque convertor output torque is multiplied basically by a reduction ratio between the output shaft of the torque convertor and sprockets for driving crawler belts for the vehicle body.

8. The dozing system for a bulldozer as claimed in one of claim 1, wherein the actual tractive force detector means includes an engine revolution sensor used for detecting a revolution speed of an engine when a torque convertor with a lock-up mechanism is locked up or when a direct transmission is employed, and the actual tractive force of the vehicle body is detected by such a calculation that: engine torque is first obtained from the engine torque characteristic of the engine, using the revolution speed of the engine detected by the engine revolution sensor; and then the engine torque thus obtained is multiplied basically by a reduction ratio between the engine and sprockets for driving crawler belts for the vehicle body.

9. The dozing system for a bulldozer as claimed in claim 8, wherein the actual tractive force detector means further includes a pitch angle sensor for detecting a pitch angle of the vehicle body inclining in forward and backward directions, and the actual tractive force detected is corrected based on the pitch angle detected by the pitch angle sensor.

10. The dozing system for a bulldozer as claimed in claim 9, wherein the pitch angle sensor provided in the actual tractive force detector means is also used as a pitch angle sensor provided in the running slip detector means.

11. The dozing system for a bulldozer as claimed in one of claim 1, wherein the actual tractive detector means includes a driving torque sensor for detecting an amount of driving torque from sprockets for driving crawler belts for the vehicle body, and the actual tractive force of the vehicle body is detected based on the amount of driving torque detected by the driving torque sensor.

12. The dozing system for a bulldozer as claimed in any one of claims 7 to 11, wherein the actual tractive force detector means further includes a pitch angle sensor for detecting a pitch angle of the vehicle body inclining in forward and backward directions, and tile actual tractive force detected is corrected based on the pitch angle detected by the pitch angle sensor.

13. The dozing system for a bulldozer as claimed in claim 12, wherein the pitch angle sensor provided in the actual tractive force detector means is also used as a pitch angle sensor provided in the running slip detector means.

14. The dozing system for a bulldozer as claimed in claim 11, wherein the actual tractive force detector means further includes a pitch angle sensor for detecting a pitch angle of the vehicle body inclining in forward and backward directions, and the actual tractive force detected is corrected based on the pitch angle detected by the pitch angle sensor.

15. The dozing system for a bulldozer as claimed in claim 14, wherein the pitch angle sensor provided in the actual tractive force detector means is also used as a pitch angle sensor provided in the running slip detector means.

16. The dozing system for a bulldozer as claimed in one of claim 1, wherein the actual tractive force detector means includes a bending stress sensor for detecting an amount of bending stress generated at trunnions which are joint parts for connecting straight frames for supporting the blade to the vehicle body, and the actual tractive force of the vehicle body is detected based on the amount of bending stress detected by the bending stress sensor.

17. A dozing system for a bulldozer, comprising:

(a) running slip detector means including a pitch angle sensor for detecting a pitch angle of the vehicle inclining in forward and backward directions, and the running slip of a vehicle body is detected by deriving acceleration elements by frequency separation from output sequentially released from the pitch angle sensor, the output indicating the pitch angle of the vehicle body which varies every moment;

(b) actual tractive force detector means for detecting an actual tractive force of the vehicle body, the vehicle body having an operable blade, and the tractive force being a force applied to the blade of the vehicle body; and (c) comparison controller means for comparing the actual tractive force detected by the actual tractive force detector means with a target tractive force which has been preset, and (i) for controlling a blade such that the blade is lifted or lowered so as to make the actual tractive force coincident with the target tractive force when the running slip has not been detected by the running slip detector means, and (ii) for controlling the blade to be lifted so as to eliminate the running slip when running slip has been detected by the running slip detector means.

18. A dozing system for a bulldozer, comprising:
(a) running slip detector means including an acceleration sensor, and a running slip of a vehicle body is detected from an output of the acceleration sensor which indicates an accelerated condition of the vehicle body;
(b) actual tractive force detector means for detecting an actual tractive force of the vehicle body, the vehicle body having an operable blade, and the tractive force being a force applied to the blade of the vehicle body; and
(c) comparison controller means for comparing the actual tractive force detected by the actual tractive force detector means with a target tractive force which has been preset, and
  (i) for controlling a blade such that the blade is lifted or lowered so as to make the actual tractive force coincident with the target tractive force when the running slip has not been detected by the running slip detector means, and
  (ii) for controlling the blade to be lifted so as to eliminate the running slip when running slip has been detected by the running slip detector means.

19. A dozing system for a bulldozer, comprising:
(a) running slip detector means including a Doppler speed meter, and a running slip of a vehicle is detected by comparing an actual speed of a vehicle body measured by the Doppler speed meter with a traveling speed of crawler belts for running the vehicle body;
(b) actual tractive force detector means for detecting an actual tractive force of the vehicle body, the vehicle body having an operable blade, and the tractive force being a force applied to the blade of the vehicle body; and
(c) comparison controller means for comparing the actual tractive force detected by the actual tractive force detector means with a target tractive force which has been preset, and
  (i) for controlling a blade such that the blade is lifted or lowered so as to make the actual tractive force coincident with the target tractive force when the running slip has not been detected by the running slip detector means, and
  (ii) for controlling the blade to be lifted so as to eliminate the running slip when the running slip has been detected by the running slip detector means.

20. A dozing system for a bulldozer, comprising:
(a) running slip detector means for detecting the running slip of a vehicle body;
(b) actual tractive force detector means for detecting an actual tractive force of the vehicle body, the vehicle body having an operable blade, and the tractive force being a force applied to the blade of the vehicle body, wherein the actual tractive force detector means includes: (i) an engine revolution sensor for detecting a revolution speed (Ne) of an engine and a torque convertor output shaft revolution sensor for detecting a revolution speed (Nt) of an output shaft of a torque convertor, and an actual tractive force of the vehicle body is detected by a calculation such that: a speed ratio e (=Nt/Ne), which is the ratio of the engine revolution speed (Ne) detected by the engine revolution sensor to the torque convertor output shaft revolution speed (Nt) detected by the torque convertor output shaft revolution sensor, is first obtained, torque convertor output torque is obtained from the torque convertor characteristic of the torque convertor, using the speed ratio e, and the torque convertor output torque is multiplied by a reduction ratio between the output shaft of the torque convertor and sprockets for driving crawler belts for the vehicle body, and (ii) a pitch angle sensor for detecting a pitch angle of the vehicle body inclining in forward and backward directions, and the actual tractive force detected is corrected based on the pitch angle detected by the pitch angle sensor; and
(c) comparison controller means for comparing the actual tractive force detected by the actual tractive force detector means with a target tractive force which has been preset, and
  (i) for controlling a blade such that the blade is lifted or lowered so as to make the actual tractive force coincident with the target tractive force when the running slip has not been detected by the running slip detector means, and
  (ii) for controlling the blade to be lifted so as to eliminate the running slip when the running slip has been detected by the running slip detector means.

21. A dozing system for a bulldozer, comprising:
(a) running slip detector means for detecting the running slip of a vehicle body;
(b) actual tractive force detector means for detecting an actual tractive force of the vehicle body, the vehicle body having an operable blade, and the tractive force being a force applied to the blade of the vehicle body, wherein the actual tractive force detector means includes an engine revolution sensor used for detecting a revolution speed of an engine when one of: (i) a torque convertor with a lock-up mechanism is locked up and (ii) a direct transmission is employed, and an actual tractive force of the vehicle body is detected by a calculation such that: engine torque is first obtained from the engine torque characteristic of the engine, using the revolution speed of the engine detected by the engine revolution sensor, and then the engine torque thus obtained is multiplied by a reduction ratio between the engine and sprockets for driving crawler belts of the vehicle body; and
(c) comparison controller means for comparing the actual tractive force detected by the actual tractive force detector means with a target tractive force which has been preset, and
  (i) for controlling a blade such that the blade is lifted or lowered so as to make the actual tractive force coincident with the target tractive force when the running slip has not been detected by the running slip detector means, and
  (ii) for controlling the blade to be lifted so as to eliminate the running slip when the running slip has been detected by the running slip detector means.

22. A dozing system for a bulldozer, comprising:
(a) running slip detector means for detecting a running slip of a vehicle body;
(b) actual tractive force detector means for detecting an actual tractive force of the vehicle body, the vehicle body having an operable blade, and the tractive force being a force applied to the blade of the vehicle body, wherein the actual tractive force detector means includes a driving torque sensor for detecting an amount of driving torque from sprockets for driving crawler belts for the vehicle body, and an actual tractive force of the vehicle body is detected based on an amount of driving torque detected by the driving torque sensor; and (c) comparison controller means for comparing the actual tractive force detected by the actual tractive force detector means with a target tractive force which has been preset, and
  (i) for controlling a blade such that the blade is lifted or lowered so as to make the actual tractive force coincident with the target tractive force when the running slip has not been detected by the running slip detector means, and
  (ii) for controlling the blade to be lifted so as to eliminate the running slip when the running slip has been detected by the running slip detector means.

23. The dozing system for a bulldozer as claimed in claim 22, wherein the actual tractive force detector means further includes a pitch angle sensor for detecting a pitch angle of the vehicle body inclining in forward and backward directions, and the actual tractive force detected is corrected based on the pitch angle detected by the pitch angle sensor.

24. The dozing system for a bulldozer as claimed in claim 20 or 23, wherein the pitch angle sensor provided in the actual tractive force detector means is also used as a pitch angle sensor provided in the running slip detector means.

25. A dozing system for a bulldozer, comprising:

(a) running slip detector means for detecting a running slip of a vehicle body;

(b) actual tractive force detector means for detecting an actual tractive force of the vehicle body, the vehicle body having an operable blade, and the tractive force being a force applied to the blade of the vehicle body, wherein the actual tractive force detector means includes a bending stress sensor for detecting an amount of bending stress generated at trunnions which are joint parts for connecting straight frames for supporting a blade to the vehicle body, and a actual tractive force of the vehicle body is detected based on an amount of bending stress detected by the bending stress sensor; and (c) comparison controller means for comparing the actual tractive force detected by the tractive force detector means with a target tractive force which has been preset, and
  (i) for controlling a blade such that the blade is lifted or lowered so as to make the actual tractive force coincident with the target tractive force when the running slip has not been detected by the running slip detector means, and
  (ii) for controlling the blade to be lifted so as to eliminate the running slip when the running slip has been detected by the running slip detector means.

26. The dozing system for a bulldozer as claimed in any one of claims 17–23 or 25, wherein the comparison controller means performs lifting or lowering of the blade such that the position of a cutting edge of the blade with respect to the ground is maintained to be a preset target cutting edge position with respect to the ground, in addition to a lifting/lowering control of the blade performed in order to make the actual tractive force coincident with the target tractive force, when the running slip is not detected by the running slip detector means.

27. The dozing system for a bulldozer as claimed in claim 26, wherein the difference between the actual tractive force and the target tractive force is small, the comparison controller means performs the blade lifting/lowering control for making the actual tractive force coincident with the target tractive force in preference to the blade lifting/lowering control for maintaining the position of the cutting edge of the blade with respect to the ground to be the target cutting edge position with respect to the ground.

28. The dozing system for a bulldozer as claimed in any one of claims 1, 4–11, 16, 17–23 or 25, wherein the lifting/lowering control of the blade by the comparison controller means is performed when a first forward speed or a second forward speed is selected in an automatic driving mode but not performed when the blade is manually operated even if the first forward speed or the second forward speed is selected in an automatic driving mode.

* * * * *